United States Patent [19]

Usui et al.

[11] Patent Number: 5,326,246
[45] Date of Patent: Jul. 5, 1994

[54] CONTROLLER FOR REVISING CONTROL PARAMETERS OF A MOLDING MACHINE

[75] Inventors: Kazuo Usui; Chiharu Nishizawa, both of Sakaki, Japan

[73] Assignee: Nissei Jushi Kogyo Kabushiki Kaisha, Nagano, Japan

[21] Appl. No.: 987,146

[22] Filed: Dec. 8, 1992

[30] Foreign Application Priority Data

Dec. 11, 1991 [JP] Japan .................................. 3-350879

[51] Int. Cl.$^5$ ............................................ B29C 45/76
[52] U.S. Cl. .................... 425/145; 264/40.7; 425/149
[58] Field of Search ................ 425/145, 149; 264/40.7

[56] References Cited

U.S. PATENT DOCUMENTS

5,062,784 11/1991 Inaba et al. ......................... 425/149

Primary Examiner—Tim Heitbrink

[57] ABSTRACT

A controller for a molding machine can easily revise control-parameters. To achieve the object, the controller comprises: a first input unit for inputting control-parameters of the molding machine; a display unit for showing a graph of a control-pattern of the molding machine, which is defined on the basis of the control-parameters, on a screen; a second input unit for revising the graph on the screen to define a revised control-pattern; a calculator for calculating revised control-parameters, which correspond to the revised control-pattern, when the control-pattern is revised; a memory for storing the control-parameters and the revised control-parameters; and a control unit for storing the control-parameters in the memory, showing the graph of the control-pattern on the display unit, calculating the revised control-parameters by the calculator when the graph is revised, and storing the revised control-parameters in the memory.

18 Claims, 6 Drawing Sheets

|  | SPEED (%) | POSITION (mm) |
|---|---|---|
| SPEED RANGE V 1 | 80.0 | 110.0 |
| V 2 | 70.0 | 90.0 |
| V 3 | 60.0 | 70.0 |
| V 4 | 50.0 | 50.0 |
| V 5 | 40.0 | 30.0 |
| V 6 | 30.0 |  |

FIG.7

|  | SPEED (%) | POSITION (mm) |
|---|---|---|
| POINT 1 | 80.0 | 130.0 |
| 2 | 80.0 | 110.0 |
| 3 | 70.0 | 110.0 |
| 4 | 70.0 | 90.0 |
| 5 | 60.0 | 90.0 |
| 6 | 60.0 | 70.0 |
| 7 | 50.0 | 70.0 |
| 8 | 50.0 | 50.0 |
| 9 | 40.0 | 50.0 |
| 10 | 40.0 | 30.0 |
| 11 | 30.0 | 30.0 |

FIG.8

|  | SPEED (%) | POSITION (㎜) |
|---|---|---|
| POINT 1 | 80.0 | 130.0 |
| 2a | 80.0 | 120.0 |
| 3 | 70.0 | 110.0 |
| 4a | 70.0 | 100.0 |
| 5 | 60.0 | 90.0 |
| 6a | 60.0 | 80.0 |
| 7 | 50.0 | 70.0 |
| 8a | 50.0 | 60.0 |
| 9 | 40.0 | 50.0 |
| 10a | 40.0 | 40.0 |
| 11 | 30.0 | 30.0 |
|  |  |  |

FIG. 9

CONTROLLER FOR REVISING CONTROL PARAMETERS OF A MOLDING MACHINE

BACKGROUND OF THE INVENTION

The present invention relates to a controller for a molding machine, more precisely relates to a controller for a molding machine, which is capable of revising control-parameters of a molding machine.

In an injection molding machine, for example, shapes of products, types of molding materials (resins), types of molds, etc. have been more complex and precise, so that control-parameters of molding conditions, e.g. injection speed, injection pressure, must be controlled in multiple stages. To execute multistage control, conventional injection molding machines have controllers to which said control-parameters for each stage are inputted.

In conventional controllers, length of time, injection speed and injection pressure with respect to positions of an injection screw, etc. for each stage are inputted thereto as numerical values.

However, the conventional controllers have a following disadvantage.

To control molding machines in multiple stages, response time of injection molding machines must be short. Namely, time length of reaching object molding conditions must be short. But action and mutation of resins are active, so that actual molding conditions change like an analogue curve, even if molding conditions are inputted as numerical values, and the controller digitally controls the injection molding machine.

By changing molding conditions like an analogue curve, it is very difficult for inexperienced operators, who are not familiar with the relationship between control-parameters numerically inputted and actual molding conditions, to revise the control-parameters so as to bring actual molding conditions close to desired conditions.

SUMMARY OF THE INVENTION

An object of the present invention is to provide a controller for a molding machine, which is capable of easily revising control-parameters.

To achieve the object, the controller comprises:
first input means for inputting control-parameters of the molding machine;
a display unit for showing a graph of a control-pattern of the molding machine, which is defined on the basis of the control-parameters, on a screen;
second input means for revising the graph on the screen to define a revised control-pattern;
calculating means for calculating revised control-parameters, which correspond to the revised control-pattern, when the control-pattern is revised;
a memory for storing the control-parameters and the revised control-parameters; and
control means for storing the control-parameters in the memory, showing the graph of the control-pattern on the display unit, calculating the revised control-parameters by the calculating means when the graph is revised, and storing the revised control-parameters in the memory.

In the present invention, the control means stores the control-parameters inputted in the memory, shows the graph of the control-pattern on the display unit, calculates the revised control-parameters by the calculating means when the graph is revised, and stores the revised control-parameters, which are calculated by the calculating means, in the memory, so that an operator is able to revise the graph, which shows a rough control-pattern, by the second input means. Therefore, it is very easy for even inexperienced operators to prepare suitable revised control-parameters, and working efficiency can be raised. Furthermore, molding machines can be controlled by the revised control-parameters, so that molding machines can be well controlled and incidence of bad products can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of an example and with reference to the accompanying drawings which are given by way of illustration only, and thus are not limitative of the present invention, and in which.

DETAILED DESCRIPTION OF A PREFERRED EMBODIMENT

A preferred embodiment of the present invention will now be described in detail with reference to the accompanying drawings.

Figure 1:
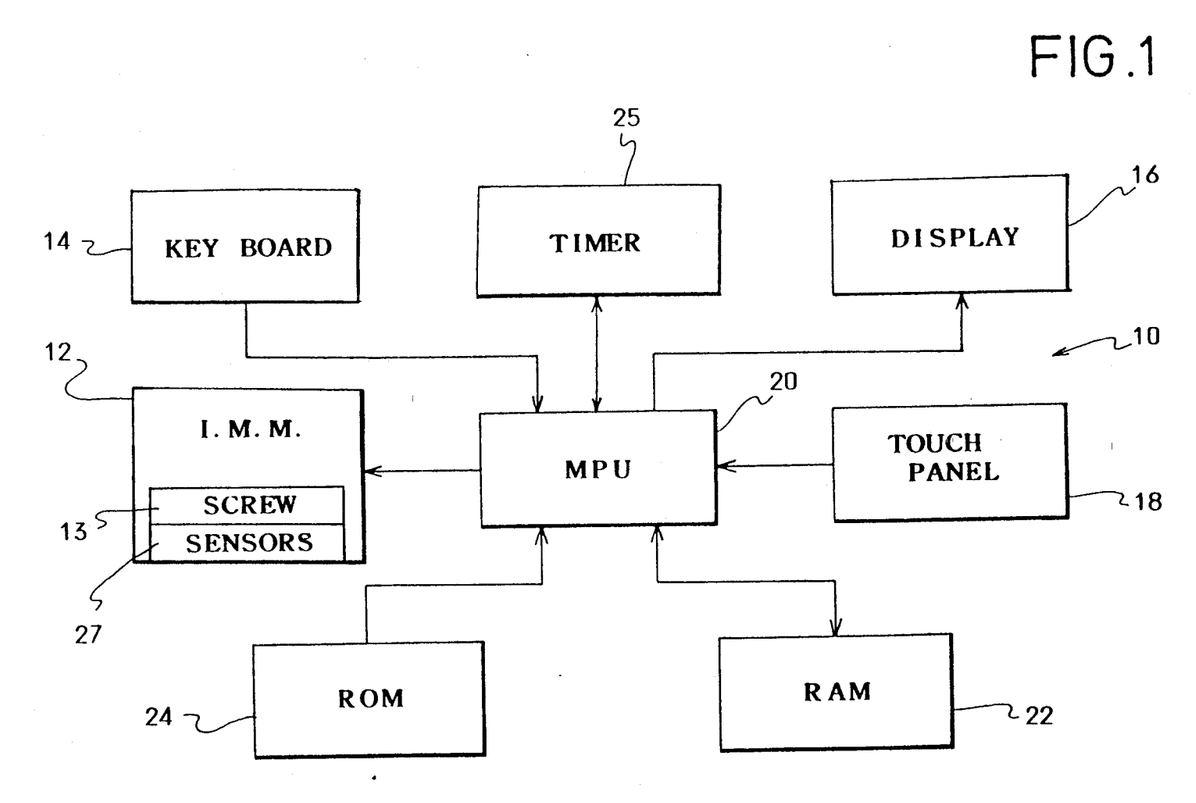
FIG. 1 is a block diagram of a controller of an embodiment of the present invention.

An injection molding machine 12 has a known structure. Molding conditions of the injection molding machine 12 is controlled by a controller 10.

A keyboard 14 includes a ten-key section, which is an example of first input means, and a cursor section, which is an example of second input means. Control-parameters of the injection molding machine 12, e.g. time length, injection speed and injection pressure with respect to positions of an injection screw 13, which is an example of means for applying pressure to a molding material (resin), are inputted as numerical values by the ten-key section. On the other hand, the cursor-key section is capable of revising a graph of control-patterns of the injection molding machine 12 shown on a display unit 16.

The display unit 16 is a color display unit. For example, a color CRT or a color LCD can be used for a color display unit. The display unit 16 is capable of showing the control-patterns, which are defined on the basis of the control-parameters inputted by the keyboard 14, on its screen. The control-patterns are shown as pulse-shaped graphs. Furthermore, the display unit is capable of showing various data, information processed, etc..

A touch panel 18, which is an example of assigning means, is made of a transparent material. The touch panel 18 is set on a screen of the display unit 16 to cover thereover. There are multiple contact points on the touch panel 18. An operator is capable of assigning items of the control-parameters, etc. by touching the contact points.

A microprocessor (MPU) has functions of calculating means and control means. When the control-pattern, which is shown on the display unit 16, is revised by the keyboard 14, the MPU 20, as the calculating means, calculates revised control-parameters, which are parameters corresponding to the revised control-pattern. And the MPU 20 stores the control-parameters, which are inputted by the keyboard 14, in a RAM 22, shows a graph of the control-pattern, which is shown as a pulse-shaped graph, on the display unit 16, calculates the revised control-parameters by its own calculating function when the pulse-shaped graph is revised, and stores the revised control-parameters in the RAM 22. Furthermore, the MPU 20 controls other parts of the injection molding machine 12 including the controller 10.

The RAM 22 is capable of storing numerical values of the control-parameters, which are inputted by the keyboard 14, and the numerical values of the revised control-parameters, which are revised by the keyboard 14, as a memory. The control-parameters are stored in the RAM 22 as a data table. The revised control-parameters are stored by renewing the data table of the control-parameters or making another data table. Besides the control-parameters and the revised control-parameters, RAM 22 is capable of temporarily storing data inputted, information processed, etc. by the MPU 20. Note that, secondary memories, such as an IC-card, can be used instead of the RAM 22.

A ROM 24 stores previous operations of the MPU 20, control programs and control data of the controller 10 and the injection molding machine 12.

Moreover, the controller 10 includes a timer 25, which is capable of measuring time length from specific time points, sensors 27 for detecting speed and present positions of the injection screw 13, present resin pressure, etc..

Figure 9:
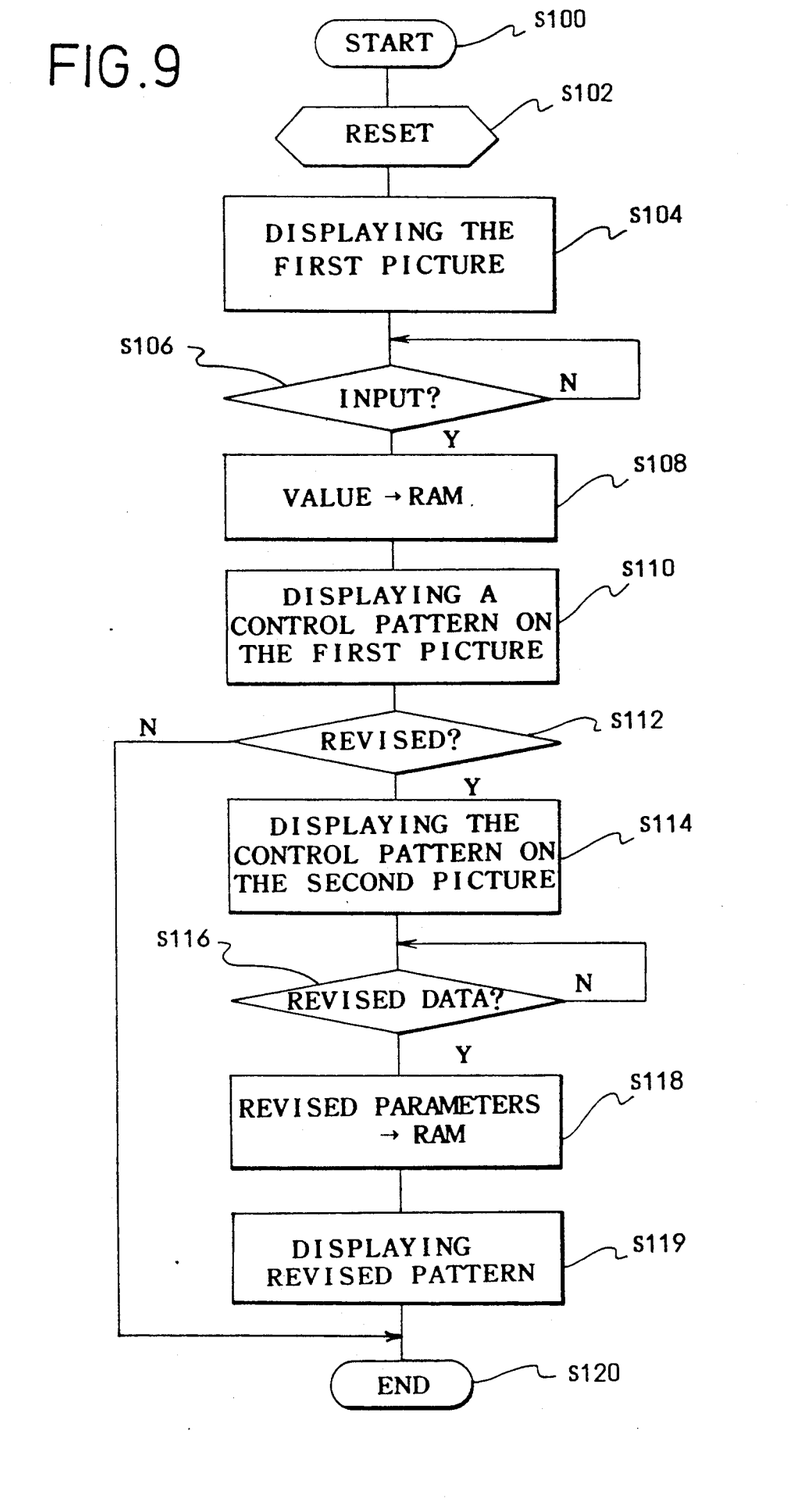
FIG. 9 is a flow chart showing function of a microprocessor.

Successively, action of the controller 10 will be explained with reference to FIG. 9.

An operator inputs a starting command by inputting the control-parameters by touching the touch panel 18 (STEP 100). The MPU 20 executes preparation jobs (STEP 102), such as reading the control programs, etc. out from the ROM 24, clearing the RAM 22.

Firstly, the MPU 20 shows a first picture on the display unit 16 (STEP 104). The first picture is shown in FIG. 2.

Figure 2:
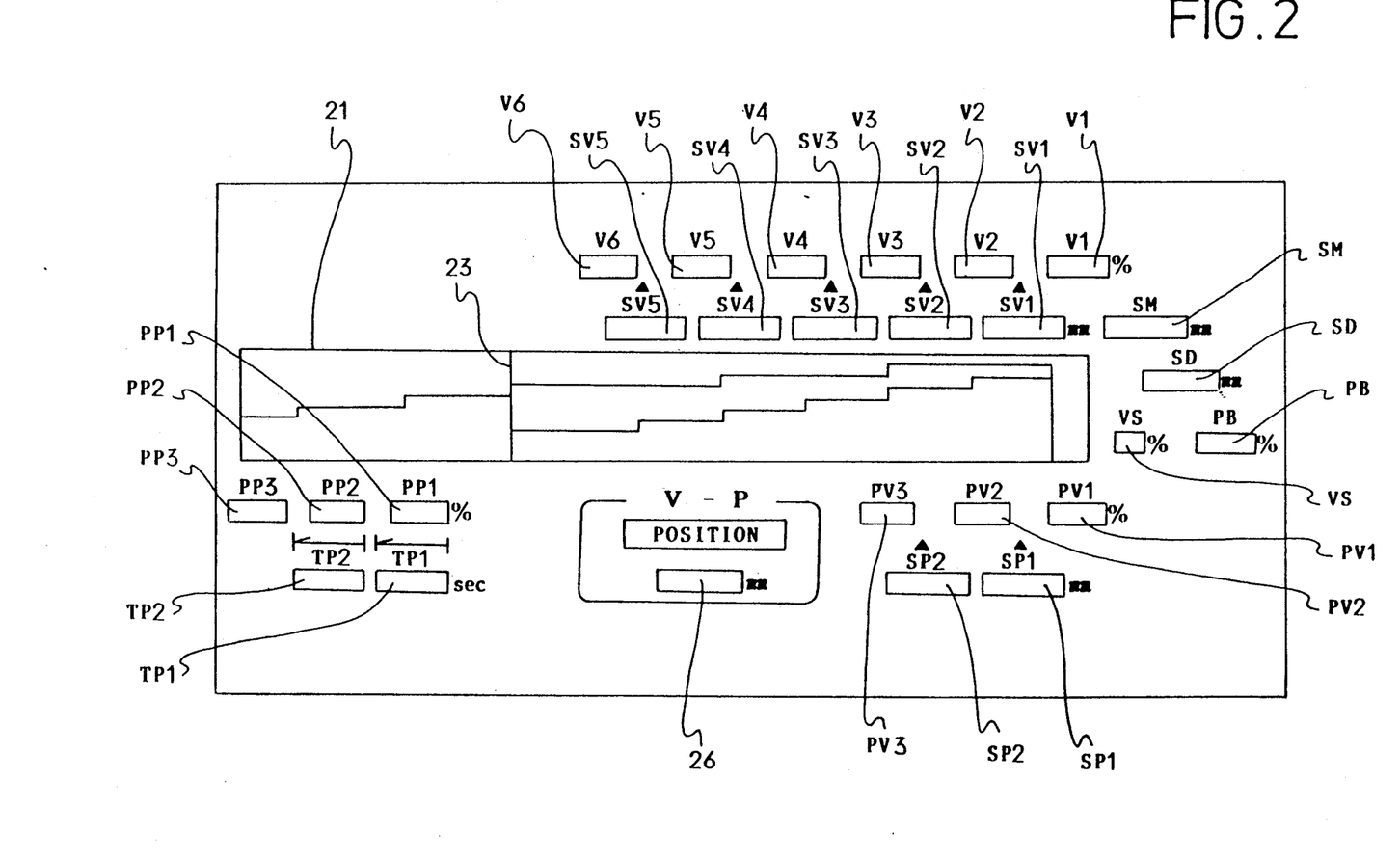
FIG. 2 is an explanation view showing a first picture of a display unit.

In FIG. 2, a graph area 21 is shown in a center of the first picture. The graph area 21 shows a preset control-pattern of the injection screw 13 of the injection molding machine 12. On the right side of a border line 23 is a speed-control area in which molding condition is controlled on the basis of the speed of the resin flow; on the left side thereof is a pressure-control area in which molding condition is controlled on the basis of resin pressure. In the present embodiment, the injection molding machine 12 is controlled on the basis of speed of the injection screw 13 in the speed-control area. The speed of the injection screw 13 is assigned with respect to positions on a stroke thereof. Unit of the speed is represented by a percentage of the maximum speed, which is previously known. On the other hand, in the pressure-control area, the injection molding machine 12 is controlled on the basis of resin pressure. The resin pressure is assigned with respect to time length. Unit of the resin pressure is represented by a percentage of the maximum pressure, which is previously known. Note that, a bottom edge of the graph area 21 represents the positions of the injection screw 13, and the injection screw 13 moves from the right to the left during injection.

In the first picture, touch areas V1, V2, V3, V4, V5 and V6 are areas for inputting speed of the injection screw 13. The speed is assigned with respect to specific positions of the injection screw 13.

A touch area SM is an area for inputting measuring position (unit: mm) of the injection screw 13.

Touch areas SV1, SV2, SV3, SV4 and SV5 are areas for inputting positions (unit: mm) for changing speed, which is inputting in the touch areas V1, V2, V3, V4, V5 and V6, of the injection screw 13.

Touch areas PV1, PV2 and PV3 are areas for inputting speed of the injection screw 13 at each assigned position (unit: mm) on a stroke thereof in the speed-control area. Note that, maximum applicable resin pressure (unit: %) at each assigned position on the stroke can be inputted in the touch areas instead of the speed. Namely, the speed of the resin flow can be defined by the maximum resin pressure.

Touch areas SP1 and SP2 are areas for inputting positions (unit: mm) for changing speed or pressure, which is inputted in the touch areas PV1, PV2 and PV3.

Touch areas PP1, PP2 and PP3 are areas for inputting resin pressure (unit: %) at each assigned time in the pressure-control area.

Touch areas TP1 and TP2 are areas for inputting time length (unit: sec.) for applying resin pressure, which is inputted in the touch areas PP1, PP2 and PP3.

A touch area SD is an area for inputting decompression-stroke length (unit: mm) of the injection screw 13.

A touch area PB is an area for inputting back pressure during measuring resin.

Back pressure is represented by a percentage of the maximum back pressure, which is previously known.

A touch area VS is an area for inputting rotational speed of the injection screw 13. The rotational speed is represented by a percentage of the maximum rotational speed, which is previously known.

A touch area 26 is an area for inputting the position (unit: mm) of the border line 23.

Note that, items of inputting are assigned by touching each touch area of the touch panel 18 with an operator's finger. And numerical values of the control-parameters are inputted by the ten-key section of the keyboard 14.

Figure 6:
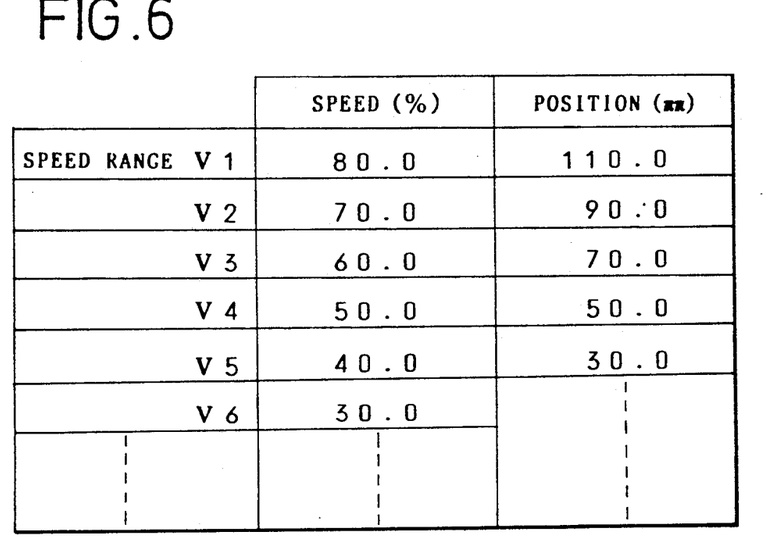
FIG. 6 is an explanation view showing data table of control-parameters logically formed in a RAM.

In the STEP 104, the MPU 20 shows the first picture on the display unit 16, and waits for inputting the numerical values of the control-parameters (STEP 106). Upon inputting the control-parameters, the MPU 20 stores them in a data table, which has been prepared in the RAM 22, in order (STEP 108). An example of the data table is shown in FIG. 6. The relationship between the speed of the injection screw 13 and the position thereof in the speed-control area is shown in the data table of FIG. 6. Other control-parameters are also stored in the RAM 22 in the same manner.

Figure 3:
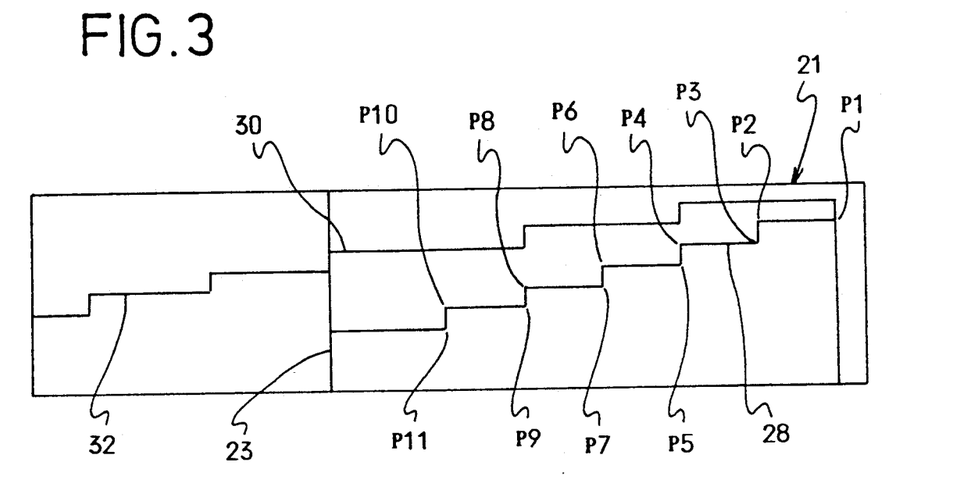
FIG. 3 is an explanation view showing a graph area of the first picture.

When the control-parameters have been stored, the MPU 20 an injection control-pattern, which is defined on the basis of the table data in the RAM 22, is shown in the graph area 21 as a pulse-shaped graph (STEP 110). An example of the pulse-shaped graph is shown in FIG. 3. In FIG. 3, a pulse-shaped graph 28 is the graph based on the data of FIG. 6. Points P1–P11 are turning points or specific points of the graph 28. The table data of FIG. 6 with respect to the points P1–P11 are interpreted as shown in FIG. 7.

A graph 30 in FIG. 3 shows a speed or maximum resin pressure control-pattern of the injection screw 13 in the speed-control area; a graph 32 in FIG. 3 shows a resin pressure control-pattern in the pressure-control area.

Note that, hereinafter, the speed control of the injection screw 13 in the speed-control will be explained.

Figure 4:
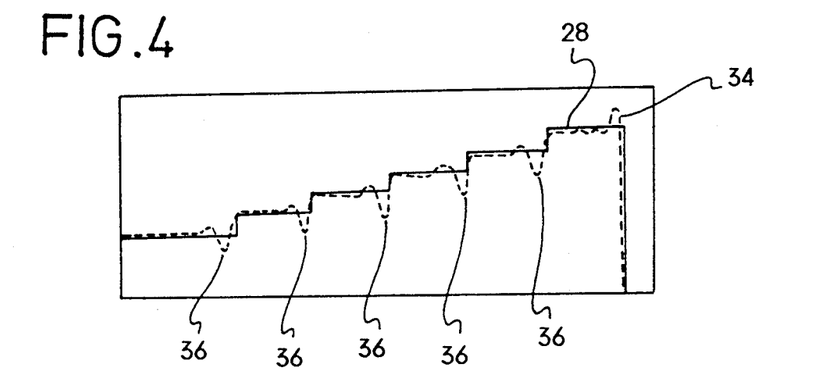
FIG. 4 is an explanation view showing a control-pattern and an actual pattern in the graph area of the first picture.
Figure 7:
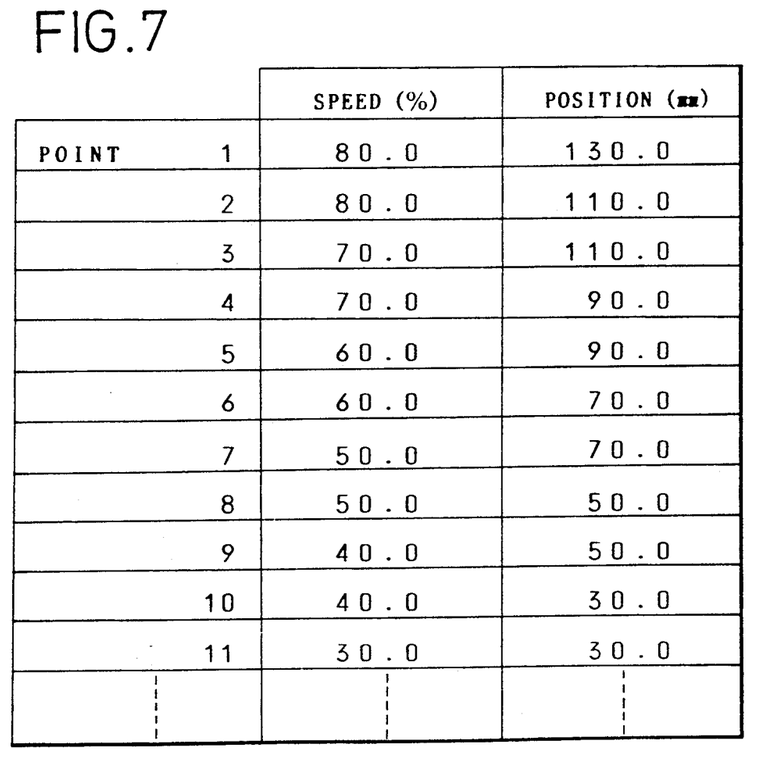
FIG. 7 is an explanation view showing data for each point of a graph, which are based on the data shown in FIG. 6.

In the STEP 110, the pulse-shaped graphs have been shown on the display unit 16, the controller is tentatively able to control the injection molding machine 12 on the basis of the data shown in FIGS. 6 or 7. When the injection molding machine 12 is controlled on the basis of the data shown in FIGS. 6 or 7, the injection screw 13 actually acts as shown in a graph 34, which is shown by a dotted line, because of resin's inactive response, etc. In the present embodiment, both the graph 28, which shows the control-pattern based on the control-parameters, and the actual pattern graph 34 can be graph area 21. By show in the both graphs, the control-pattern can be easily revised. As clearly shown in FIG. 4, the actual graph 34 has undershoot sections 36, which correspond to trailing edges of the graph 28. The undershoot sections 36 should be deleted. To delete the undershoot sections 36, an operator revises the control-pattern and the control-parameters by using the touch panel 18 and the keyboard 14.

Figure 5:
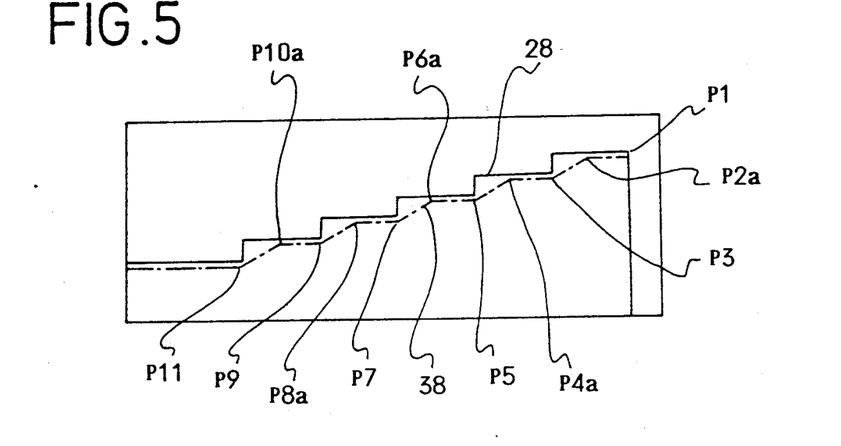
FIG. 5 is an explanation view showing the control-pattern and a revised control-pattern in a graph area of a second picture.

When the operator inputs a command of revising the control-pattern and the control-parameters (STEP 112), the MPU 20 shows a second picture, which is an enlarged picture of the first picture, and shows the graph 28 thereon (STEP 114).

Figure 8:
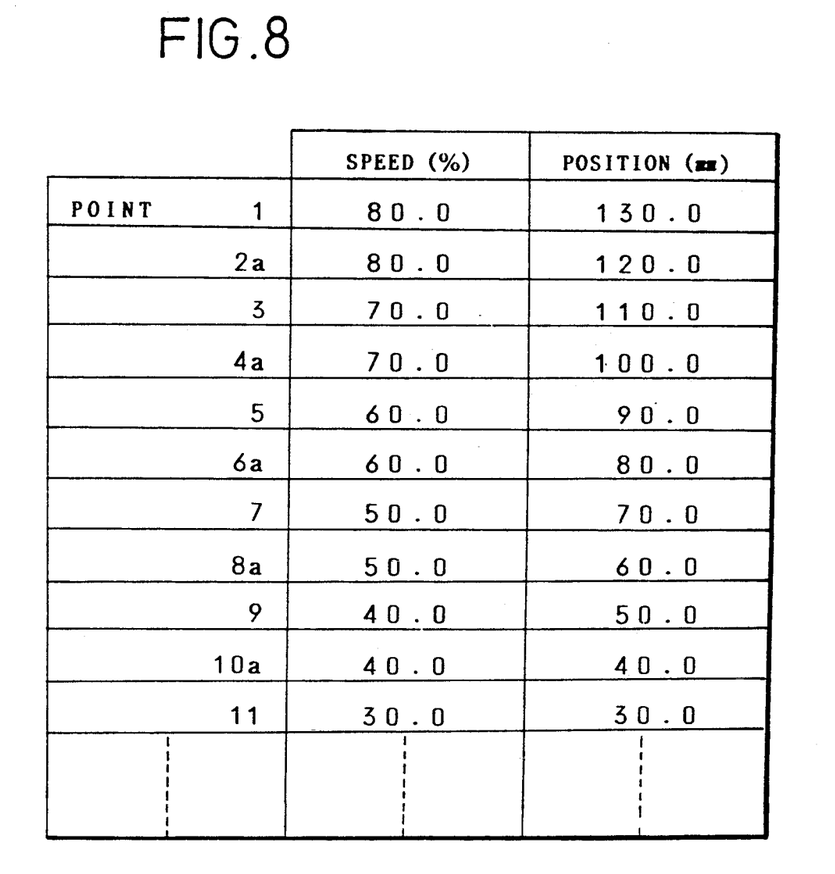
FIG. 8 is an explanation view showing revised data of the data shown in FIG. 7, which are revised on the basis of revised control-parameters.

The operator watches and revises the enlarged graph 28 shown on the second picture. According to the graph 28, the undershoot sections 36 of the graph 34 can be suppressed by inclining the trailing edges of the graph 28. Then the operator moves points P2, P4, P6, P8 and P10 rightward by using the cursor-key section of the keyboard 14 to revise the control-pattern. The revised control-pattern is shown by a one-dot chain line 38. By changing the points P2, P4, P6, P8 and P10 on the graph area 21, the MPU 20 knows that revised data are inputted (STEP 116), then the MPU 20 renews the data table of the control-parameters or makes another data table based on the revised control-parameters (STEP 118), and a graph 38 of the revised control-pattern, which is based on the revised control-parameters on the second picture (STEP 119). Namely, the data table shown in FIG. 6 is renewed as the data shown in FIG. 7 is revised to data shown in FIG. 8, or a new data, which is shown in FIG. 8, is made. Note that, in the present embodiment, the revised control-pattern graph 38 and the former control-pattern graph 28 are continuously shown in different colors on the second picture.

Afterwards, if the revised control-pattern is settled by inputting proper command, the MPU 20 deletes the graph 28.

If proper revised control-parameters have been settled, the MPU 20 completes a set of sequential actions (STEP 120), and normally controls the injection molding machine 12.

In the present embodiment, the revision for putting actual pattern close to the pulse-shaped control-pattern. Furthermore, the second picture may be called to revise the control-pattern immediately after inputting the pulse-shaped control-pattern so as to put estimated patterns close to desired patterns.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A controller for a molding machine, comprising:
    first input means for inputting control-parameters of said molding machine;
    a display unit for showing a graph of a control-pattern of said molding machine, which is defined on the basis of the control-parameters, on a screen;
    second input means for revising the graph on said screen to define a revised control-pattern;
    calculating means for calculating revised control-parameters, which correspond to the revised control-pattern, when the control-pattern is revised;
    a memory for storing the control parameters and the revised control-parameters; and
    control means for storing the control-parameters in said memory, showing the graph of the control-pattern on said display unit, calculating the revised control-parameters by said calculating means when the graph is revised, and storing the revised control-parameters in said memory.

2. The controller for a molding machine according to claim 1 wherein,
    said molding machine is an injection molding machine.

3. The controller for a molding machine according to claim 1 wherein,
    said first input means and said second input means are a keyboard.

4. The controller for a molding machine according to claim 2 wherein,
    the first input means inputs parameters including length of time, and injection speed and injection pressure with respect to positions of an injection screw.

5. The controller for a molding machine according to claim 1 wherein,
    said display unit is a color display unit.

6. The controller for a molding machine according to claim 1 wherein,
    the display unit shows said control-pattern as a pulse-shaped graph.

7. The controller for a molding machine according to claim 1 wherein,
    the display unit shows said control-pattern as a pattern in a speed-control area and a pattern in a pressure-control area.

8. The controller for a molding machine according to claim 7 wherein,
the display unit shows said pattern in the speed-control area as a pattern of controlling speed of a molding material.

9. The controller for a molding machine according to claim 7 wherein,
the display unit shows said pattern in the speed-control area as a pattern of maximum pressure of the molding material for controlling the speed thereof.

10. The controller for a molding machine according to claim 7 wherein,
the display unit shows said pattern in the pressure-control area as a pattern of controlling pressure of a molding material.

11. The controller for a molding machine according to claim 1,
further comprising assigning means for inputting parameters of said control-parameters.

12. The controller for a molding machine according to claim 11 wherein,
said assigning means is a touch panel.

13. The controller for a molding machine according to claim 5,
further comprising a touch panel for inputting parameters of said control-parameters, said touch panel covering said screen of said display unit.

14. The controller for a molding machine according to claim 1 wherein,
said display unit is capable of simultaneously showing said control-pattern and said revised control-pattern on said screen.

15. The controller for a molding machine according to claim 5 wherein,
said color CRT is capable of simultaneously showing said control-pattern and said revised control-pattern in different colors.

16. The controller for a molding machine according to claim 1 wherein,
said memory is a RAM.

17. The controller for a molding machine according to claim 5 wherein,
said color display unit is a color CRT.

18. The controller for a molding machine according to claim 5 wherein,
said color display unit is a color LCD.

* * * * *